US008911525B1

(12) United States Patent
Ward

(10) Patent No.: US 8,911,525 B1
(45) Date of Patent: Dec. 16, 2014

(54) ENGINEERED SOILLESS PLANT CULITVATION MEDIUM

(71) Applicant: Nano Growth Technologies, LLC, Portsmouth, NH (US)

(72) Inventor: Timothy Ward, Rye, NH (US)

(73) Assignee: Nano Growth Technologies, LLC, Portsmouth, NH (US)

( * ) Notice: Subject to any disclaimer, the term of this patent is extended or adjusted under 35 U.S.C. 154(b) by 0 days.

(21) Appl. No.: 13/913,843

(22) Filed: Jun. 10, 2013

(51) Int. Cl.
| | |
|---|---|
| C05F 11/04 | (2006.01) |
| C05D 1/00 | (2006.01) |
| C05D 3/00 | (2006.01) |
| C05D 5/00 | (2006.01) |
| C05D 9/00 | (2006.01) |
| C05D 9/02 | (2006.01) |
| C05B 17/02 | (2006.01) |

(52) U.S. Cl.
CPC ..................................... C05B 17/02 (2013.01)
USPC ................ 71/32; 71/24; 71/31; 71/33; 71/48; 71/53; 71/63

(58) Field of Classification Search
USPC ......................................................... 71/11–63
See application file for complete search history.

(56) References Cited

U.S. PATENT DOCUMENTS

| | | | |
|---|---|---|---|
| 3,582,312 A | 6/1971 | Cole et al. | |
| 3,990,963 A * | 11/1976 | Audibert et al. | 208/179 |
| 4,067,716 A * | 1/1978 | Sterrett | 71/24 |
| 4,074,997 A * | 2/1978 | Cohen | 71/24 |
| 4,168,962 A | 9/1979 | Lambeth | |
| 4,174,957 A * | 11/1979 | Webb et al. | 71/24 |
| 4,229,442 A * | 10/1980 | Pinckard | 424/725 |
| 4,767,440 A * | 8/1988 | Salac | 71/23 |
| 5,578,210 A | 11/1996 | Klecka | |
| 5,867,937 A * | 2/1999 | Templeton | 47/59 R |
| 5,900,038 A | 5/1999 | Wilhelm et al. | |
| 5,997,602 A * | 12/1999 | Aijala | 71/28 |
| 6,074,988 A | 6/2000 | King et al. | |
| 7,726,069 B1 | 6/2010 | Zauche et al. | |
| 8,425,819 B2 * | 4/2013 | Zheng | 264/148 |
| 8,568,505 B2 * | 10/2013 | Wells | 71/23 |
| 8,702,833 B2 * | 4/2014 | Sugiyama | 71/24 |
| 8,756,862 B1 * | 6/2014 | Huberman et al. | 47/59 S |
| 2003/0089152 A1 * | 5/2003 | Yelanich et al. | 71/23 |
| 2005/0178177 A1 | 8/2005 | Parent et al. | |

(Continued)

FOREIGN PATENT DOCUMENTS

WO 2007/059583 * 5/2007

OTHER PUBLICATIONS

Boodley, James W. et al., Cornell Peat-Lite Mixes for Commercial Plant Growing, Information Bulletin 43, A Cornell Cooperative Extension Publication, pp. 1-8, 050/100, Revised 4/82, SL 5M 8008.

(Continued)

Primary Examiner — Wayne Langel
(74) Attorney, Agent, or Firm — Andrus Intellectual Property Law LLC

(57) ABSTRACT

An engineered soilless plant cultivation medium for potting applications includes specific balanced amounts of nutrient additives. Major nutrient cations (Ca, Mg, K, Na, H) are balanced according to optimal base saturation percentage ranges. Nutrient levels, namely, the amount of major nutrient cations, major nutrient anions and minor nutrients satisfy desired ranges for both standard Mehlich III soil extraction tests and saturated paste tests.

18 Claims, 3 Drawing Sheets

(56) References Cited

U.S. PATENT DOCUMENTS

| | | | |
|---|---|---|---|
| 2006/0112749 A1* | 6/2006 | Noll et al. | 71/22 |
| 2013/0000520 A1 | 1/2013 | Wu et al. | |
| 2013/0312469 A1* | 11/2013 | Yamashita | 71/23 |
| 2014/0069158 A1* | 3/2014 | Chen et al. | 71/24 |
| 2014/0090431 A1* | 4/2014 | Blotsky et al. | 71/11 |

OTHER PUBLICATIONS

Kline, Gary L. et al., The Ideal Soil: A Handbook for the New Agriculture, Copyright 2010 SoilMinerals.com, ISBN #978-0-9844876-0-8, p. 89.

Appropriate Technology Transfer for Rural Areas, Organic Potting Mixes, Horticulture Technical Notes, pp. 1-26, website visited May 1, 2013.

Sungro Horticulture, Conversions, Calculations & Fill Guides, 2013 Sun Gro Horticulture Canada Ltd., www.sungro. com, p. 12, www.sungro.com, website visited Jun. 14, 2013.

Sungro Horticulture, Product Usage Guides, p. 3, www.sungro.com, website visited Jun. 14, 2013.

Neal Kinsey's Hands-On Agronomy, Copyright 1993-2009, Acres USA, Chapter 1, pp. 2, 3, 6.

Neal Kinsey's Hands-On Agronomy, Copyright 1993-2009, Acres USA, Chapter 2, pp. 29-40, 49, 50-54.

Neal Kinsey's Hands-On Agronomy, Copyright 1993-2009, Acres USA, Chapter 3, pp. 57-66, 68-70, 73, 75, 78, 80.

Neal Kinsey's Hands-On Agronomy, Copyright 1993-2009, Acres USA, Chapter 4, pp. 86-87, 89-90, 95-96.

Neal Kinsey's Hands-On Agronomy, Copyright 1993-2009, Acres USA, Chapter 5, pp. 109-112, 114, 118-119, 121.

Neal Kinsey's Hands-On Agronomy, Copyright 1993-2009, Acres USA, Chapter 6, pp. 150, 152-154.

Neal Kinsey's Hands-On Agronomy, Copyright 1993-2009, Acres USA, Chapter 7, p. 178.

Neal Kinsey's Hands-On Agronomy, Copyright 1993-2009, Acres USA, Chapter 8, pp. 184-192.

Neal Kinsey's Hands-On Agronomy, Copyright 1993-2009, Acres USA, Chapter 10, pp. 224-228, 232-233, 236.

Neal Kinsey's Hands-On Agronomy, Copyright 1993-2009, Acres USA, Chapter 11, p. 240.

Neal Kinsey's Hands-On Agronomy, Copyright 1993-2009, Acres USA, Chapter 12, pp. 252-255, 270-271, 273.

Neal Kinsey's Hands-On Agronomy, Copyright 1993-2009, Acres USA, Chapter 13, pp. 298-300, 301.

Neal Kinsey's Hands-On Agronomy, Copyright 1993-2009, Acres USA, Chapter 15, pp. 330-341.

Neal Kinsey's Hands-On Agronomy, Copyright 1993-2009, Acres USA, Chapter 16, p. 348.

William A. Albrecht, Ph.D., Soil Fertility & Animal Health, The Albrecht Papers, vol. 2, Copyright 1975, 2005 Acres USA, Foreword.

William A. Albrecht, Ph.D., Soil Fertility & Animal Health, The Albrecht Papers, vol. 2, Copyright 1975, 2005 Acres USA, Chapter 1.

William A. Albrecht, Ph.D., Soil Fertility & Animal Health, The Albrecht Papers, vol. 2, Copyright 1975, 2005 Acres USA, Chapter 3, pp. 19-27.

William A. Albrecht, Ph.D., Soil Fertility & Animal Health, The Albrecht Papers, vol. 2, Copyright 1975, 2005 Acres USA, Chapter 5, pp. 39-52.

William A. Albrecht, Ph.D., Soil Fertility & Animal Health, The Albrecht Papers, vol. 2, Copyright 1975, 2005 Acres USA, Chapter 6, pp. 53-58, 64-67.

William A. Albrecht, Ph.D., Soil Fertility & Animal Health, The Albrecht Papers, vol. 2, Copyright 1975, 2005 Acres USA, Chapter 7, pp. 69-78.

William A. Albrecht, Ph.D., Soil Fertility & Animal Health, The Albrecht Papers, vol. 2, Copyright 1975, 2005 Acres USA, Chapter 9, pp. 102, 110-111.

William A. Albrecht, Ph.D., Soil Fertility & Animal Health, The Albrecht Papers, vol. 2, Copyright 1975, 2005 Acres USA, Chapter 10, pp. 113-114.

William A. Albrecht, Ph.D., Soil Fertility & Animal Health, The Albrecht Papers, vol. 2, Copyright 1975, 2005 Acres USA, Chapter 14, pp. 180-181.

William "Crop Doc" McKibben, The Art of Balancing Soil Nutrients, A Practical Guide to Interpreting Soil Tests, Copyright 2012 by Williams McKibben, Chapter 1.

William "Crop Doc" McKibben, The Art of Balancing Soil Nutrients, A Practical Guide to Interpreting Soil Tests, Copyright 2012 by Williams McKibben, Chapter 2, p. 25, "selecting a soil testing lab", and pp. 29-31.

William "Crop Doc" McKibben, The Art of Balancing Soil Nutrients, A Practical Guide to Interpreting Soil Tests, Copyright 2012 by Williams McKibben, Chapter 3, pp. 33-34, 36, 38-41, 46, 53 "understanding solubility testing" and pp. 54-55, 57-58.

William "Crop Doc" McKibben, The Art of Balancing Soil Nutrients, A Practical Guide to Interpreting Soil Tests, Copyright 2012 by Williams McKibben, Chapter 4, pp. 79-82, 107.

William "Crop Doc" McKibben, The Art of Balancing Soil Nutrients, A Practical Guide to Interpreting Soil Tests, Copyright 2012 by Williams McKibben, Chapter 5, pp. 109-110.

William "Crop Doc" McKibben, The Art of Balancing Soil Nutrients, A Practical Guide to Interpreting Soil Tests, Copyright 2012 by Williams McKibben, Chapter 6, p. 187 "crop removal chart of nutrients".

Michael Asters with Agricola, The Ideal Soil, Copyright 2010-2012 soilminerals.com, vol. 1.3, Chapter 2, pp. 18-24, 26.

Michael Asters with Agricola, The Ideal Soil, Copyright 2010-2012 soilminerals.com, vol. 1.3, Chapter 6, pp. 52-56 sources of raw material.

Michael Asters with Agricola, The Ideal Soil, Copyright 2010-2012 soilminerals.com, vol. 1.3, Chapter 7, pp. 70-72, 81, 89-91, 106-1117, 122-130.

* cited by examiner

ENGINEERED SOILLESS PLANT CULITVATION MEDIUM

FIELD OF THE INVENTION

The present invention relates to engineered soilless plant cultivation medium primarily for use in potting applications. The cultivation medium comprises a soilless substrate mixture and specific balanced amounts of mineral additives mixed into the soilless substrate mixture. Nutrient levels, namely, the amount of major nutrient cations, major nutrient anions and minor nutrients satisfy desired ranges for both standard Mehlich III soil tests and saturated paste tests. Major nutrient cations (Ca++, Mg++, K+, Na+, H+) are balanced in amounts according to optimal base saturation percentage ranges.

BACKGROUND OF THE INVENTION

A wide variety of potting soils and other growing medium have been developed for growing potted plants. Perhaps the most common are mixtures having a base of sphagnum peat moss, soil, ground coconut coir, composted hardwood bark, or composted manure. Soilless potting mixes are desirable because quality top soil can be hard to find, and in any event it can be inconsistent in terms of air and water circulation and can also contain diseased organisms. Achieving the best growing results requires balance in terms of chemistry, composition and structure of the soil or the cultivation medium.

Many characteristics of engineered soilless cultivation medium can vary and have significant effect on the growing response of the plants. For example, the cation exchange capacity of the cultivation medium can vary substantially, or the major minerals in the cultivation medium can be out of balance, or key minor or trace minerals can be nonexistent. It has been said that the availability of the most abundant nutrient in a soil is only as good as the availability of the least abundant nutrients in the soil. For example, if calcium is deficient, many nutrients cannot be transported to and adsorbed by the roots. On the other hand, an excess of certain minerals or nutrients can block the plants ability to adsorb other vital nutrients. For example, if a soil or cultivation medium has too much potassium, the potassium can block the absorption of magnesium. Too much phosphorus can block zinc and calcium uptake by precipitating phosphorus compounds low in solubility. There are also more complex relationships: such as, when the combination of the concentrations of sodium and potassium is excessive, magnesium uptake is blocked even when there is an appropriate amount of magnesium available.

Beginning in the 1930s, William Albrecht from the University of Missouri came to the conclusion that the ideal balance of major cations in agricultural soil should be balanced in view of the cation exchange capacity (CEC) of the soil. Cation exchange capacity is the maximum quantity of exchangeable cations that a soil is capable of holding. Cation exchange capacity in this regard is a measure of fertility and nutrient retention capacity. It is expressed in units of milliequivalent of hydrogen per 100 g of dry soil (mEq/100 g), and corresponds to the number of positive charges that the soil can hold. Closely related to the cation exchange capacity is the concept of base saturation percentage. Base saturation percentage is the fraction of exchangeable cations of the major cation nutrients in the soil (Ca++, Mg++, K+, Na+ and H+).

In common soils, clay particles and humus (organic matter) carry negative charge sites. Fertilizer components having a positive charge (i.e. cations) are attracted to these negative sites and are thus held in the soil to be exchanged with plant roots. In general, the higher the clay content, the higher ability of the soil to hold cations and the higher the cation exchange capacity. In comparison, very sandy soil does not have the ability to hold and exchange nutrients. It is therefore more difficult to grow healthy food crops in sandy soil because of leaching and the inability to hold vital nutrients in place for exchange and uptake into the plant root. Yet, soil with too much clay and not enough sand and other matter will tend to compact and have insufficient air pore space and water pore space.

The cation exchange capacity (CEC) is calculated in soils through the summation of cations found in soil extraction solutions. While there are various types of soil extraction tests used in the art, the Mehlich III test is a standard soil extraction test used by many in the art. In agricultural applications, cation exchange capacity is sometimes measured with the goal of determining the appropriate amounts of mineral additives necessary to achieve balanced base cation saturation ratios (BCSR). Neal Kinsey and Charles Walters authored a book entitled "Hands on Agronomy", Acres U.S.A., Copyright 1993-2009, which built on Williams Albrecht's work and has become one of the most widely known and influential works on the BCSR system. Kinsey et al. have defined the modem ideal ratios of 60-70% calcium (Ca++), 10-20% magnesium (Mg++), 3-5% potassium (K+), 1% sodium (Na+), and 10-15% exchange hydrogen (H+), and 2-4% other cations. See, e.g., Kinsey et al., "Hands on Agronomy", pp. 25, 30-31, 34, 49-53, 80 and 96. In agricultural applications, it is normally prohibitively expensive to amend the soil to any large degree in order to provide an optimum cation exchange capacity. Rather, fertilizers are added in order to balance the cation saturations ratios in order to utilize to the soil's natural cation exchange capacity to its fullest extent.

It is generally thought desirable for the cation exchange capacity to be between 10-18 mEq/100 g (soil) in order for the soil to optimally hold and store sufficient nutrients, and then release them appropriately to the plant as the plant needs the nutrients. According to the Albrecht method, the soil should also contain organic matter (humus) in the range of about 5-10% (by volume) in order to assist in providing sufficient nitrogen. Nitrogen in organic matter, namely humus, is released effectively when soil chemistry and physics are balanced to ideal levels. In addition, soil bacteria converts nitrogen from air and may provide up to an additional 35% of nitrogen if soil conditions are again balanced to ideal levels. According to Albrecht, it is highly desirable that at least seventeen (17) other major nutrients, minor nutrients and trace elements must be present, in addition to the major cation ratios being balanced, in order to foster optimum plant growth and nutrient uptake. BCSR practitioners believe that adhering to the method shortens growth times, increases yields, and provides more nutrient dense crops. Also, healthier plants and shorter growing cycles limits susceptibility to pests and weeds. Many professional agronomists conduct soil audits and practice the BCSR system for small to large scale farming operations.

U.S. Pat. No. 4,168,962 entitled "Plant Growth Medium" by Victor N. Lambeth assigned to The Curators of the University of Missouri, issuing on Sep. 25, 1979 discloses a foam-like composition of vermiculite, perlite and clay that is used as a potting soil substitute for container grown plants. The '962 patent discloses the addition of cations based on a recommended percentage saturation of the subsoil exchange capacity (although somewhat different than the modem ideal ratios published by Neal Kinsey et al.). In the '962 patent, a slurry of nutrient rich clay, vermiculite and perlite was mixed and dried to make a rigid foam-like inorganic growth medium. Other nutrients, apart from the nutrients naturally in the clay, were not added. The '962 patent compares growth results of tomatoes in the inorganic growth medium to the growth of tomatoes in Cornell peat-lite mix A (which is believed to have been a mix of peat moss, vermiculite, limestone, phosphate, calcium and potassium). The Cornell peat-lite A mixture, however, was not balanced per the BCSR method, and as with the foam-like plant inorganic plant growth medium, was not tested for other minerals and trace elements.

SUMMARY OF THE INVENTION

The invention is directed to an engineered soilless plant cultivation medium intended primarily to be used to grow crops in containers or pots. It is particularly well-suited for growing a wide variety of cultivated plants such as ornamental flowers, vegetables, herbs or other crops like legal cannabis. The engineered soilless cultivation medium reliably accelerates growing cycles and provides higher, more nutrient dense yields by optimizing soil structure and chemistry rather than directly feeding plants with fertilizer through trial and error. Use of the engineered soilless cultivation medium should not require the use of additional soil amendments or additional fertilizer during the growth cycle in order to achieve improved results.

The engineered soilless plant cultivation medium contains a soilless substrate mixture comprising at least peat moss and vermiculite, and preferably sharp sand as well. The engineered cultivation medium also includes specific balanced amounts of the major nutrient cations: calcium, magnesium, potassium, sodium and hydrogen. The major nutrient cations ($Ca^{++}$, $Mg^{++}$, $K^+$, $Na^+$ and $H^+$) are balanced according to the base cation saturation ratio (BCSR) method. More specifically, measurements are taken according to a standard Mehlich III soil extraction test to determine whether the major nutrient cations are appropriately balanced. The engineered soilless cultivation medium should have a cation exchange capacity (CEC) of 10-15 mEq/100 g, and preferably about 12 mEq/100 g. The base saturation percentage of the calcium according to a standard Mehlich III soil extraction test is within the range of about 60-70% of the cation exchange capacity of the engineered soilless cultivation medium. The base saturation percentage of the magnesium is within the range of about 10-20% of the cation exchange capacity of the engineered soilless cultivation medium. The base saturation percentage of the potassium is within the range of about 3-8% of the cation exchange capacity of the engineered soilless cultivation medium. The base saturation percentage of sodium is less than about 3% of the cation exchange capacity of the engineered soilless cultivation medium. In addition, the base saturation percentage of exchangeable hydrogen in the engineered soilless cultivation medium is within the range of about 7-15% of the cation exchange capacity of the medium. It is also desirable that the combination of the calcium and magnesium base saturation percentages not exceed 80% of the cation exchange capacity of the cultivation medium. These percentage ranges are similar to the modem teachings of the base cation saturation ratio (BCSR) method common in agricultural applications.

In a particularly desirable embodiment of the invention, saturated paste test on the engineered cultivation medium also results in: calcium in the range of about 30-45 ppm, magnesium in the range of about 7-8 ppm, potassium in the range of about 15-20 ppm, and sodium less than about 3 ppm, where the ppm refers to parts per million in terms of mass of the specific nutrient per mass of the solution. Standard Mehlich III soil tests, while important, can sometimes be a poor predictor of what nutrients are available for uptake by the plant from the soil or cultivation medium. Standard Mehlich III soil tests provide a nutrient rate that is held primarily in the soil colloid, whereas saturation paste tests reveal the level of nutrients in solution form that are readily available for uptake by plant roots. In a typical saturated paste test, the cultivation medium or soil sample is saturated with water (e.g. de-ionized water) and the water is extracted with a vacuum and analyzed, using an inductively coupled plasma unit. Since the bulk of nutrients taken up by plants are in solution form, it is desirable that the engineered soilless cultivation medium satisfies saturated paste test criteria in addition to standard Mehlich III soil testing criteria.

The preferred soilless substrate mix contains a mix of about 70% by volume peat moss, about 20% by volume vermiculite, and about 10% by volume sharp sand. As mentioned, vermiculite is an expanded form of multiple layers of mica, and the surfaces of each layer carry negative charges. The unique plate-like structure of vermiculite enables it to hold and release large quantities of water and minerals for the plant. The peat moss, as is known in the art, should be treated with a surfactant to improve its wettability prior to mixing. Once treated with surfactant, peat moss holds a great deal of water and does not decompose quickly. The sharp sand adds air space and improves drainage. It is desirable that the resulting cultivation medium contains 15% to 30% air pore space and 15% to 30% to water pore space, and ideally about 25% air pore space and 25% water pore space. The pH of the resulting engineered cultivation medium is desirably within the range of about 6.1 to 6.8, and most desirably is about 6.4.

The engineered soilless cultivation medium also desirably includes other mineral additives in balanced amounts. It should include the major nutrient anions of phosphorus and sulfur in balanced amounts. It should also include minor nutrient elements including boron, iron, manganese, copper, zinc and aluminum in balanced amounts. In all, the engineered cultivation medium preferably includes at least the above listed nutrients (Ca, Mg, K, Na, H, P, S, B, Fe, Mn, Cu, Z, Al) in balanced amounts.

It is preferred that a Mehlich III test on the engineered cultivation medium result in phosphorus in the range of about 150-300 ppm, and that a saturated paste test on the engineered cultivation medium result in phosphorus in the range of about 1.5-2.5 ppm. The ppm notation when referring to Mehlich III soil test results refers to parts per million in terms of mass of the specific nutrient per mass of the dehydrated sample of soilless cultivation medium, and has a somewhat different connotation than when referring to saturated paste test results. When referring to saturated soil paste test results, as mentioned previously, ppm notation refers to parts per million in terms of mass of the specific nutrient per mass of the solution extracted from a saturated sample of soilless cultivation medium. It is further desired that a Mehlich III test on the engineered cultivation medium result in sulfur in the range of about 30-60 ppm, and that a saturated paste test on the engineered cultivation medium result in sulfur in the range of about 30-50 ppm.

In addition, it is desired that boron be present according to a Mehlich III test in the range of about 0.8-1.5 ppm, and a saturated paste test result for boron in the range of about 0.8-1.5 ppm. Iron is desirably present according to a Mehlich III test in the range of about 100-300 ppm, with a saturated paste test result for iron being in the range of 80-120 ppm. Magnesium is preferably present according to a Mehlich III test in the range of about 30-60 ppm with a saturated paste test result for magnesium in the range of about 0.07-1.5 ppm. Copper is desirably present according to a Mehlich III test in the range of 5-10 ppm with a saturated paste result for copper in the range about 0.05-1.2 ppm. Zinc is desirably present according to a Mehlich III test in the range of about 3% of the phosphorus in terms of ppm, with a saturated paste test result for zinc in the range of about 3% of the phosphorus in terms of ppm. Aluminum according to a Mehlich III test is preferably less than about 500 ppm, with a saturated paste test result for aluminum less than about 2.0 ppm.

It is also desirable that the soilless cultivation medium contain various trace elements such as chromium, cobalt, iodine, molybdenum, selenium, tin, vanadium, nickel, fluorine and silicon. It should be noted that invention is not limited to soilless cultivation media having only the above listed nutrient and trace elements. For example, one or more sources of nitrogen should likely be added to the engineered soilless cultivation medium. Desirably, the engineered cultivation medium should include 5% to 15% organic matter in the form of humus, which can be provided by the peat moss or vermiculite and/or via other ingredients such as chicken manure. Other ingredients, such as biologicals, that do not affect the balance of the above listed nutrients and trace elements can also be added if desired or found useful. It should be emphasized, however, that providing vital nutrients and trace elements in the ranges described above should lead to improved growing cycles, plant nutrition and/or yields for a wide range of cultivated plants. It should also be noted that benefits of the invention can be realized to a lesser degree even if Mehlich III and saturated paste test results on the soilless cultivation medium fall somewhat outside of the above listed ranges. In this regard, the term "about" means no more than a 10% numerical variation from an identified numerical value or from each numerical value listed for an identified range.

It is contemplated that the soilless substrate mixture and raw ingredients for the nutrient additives will be premixed, along with any other additives, and then a measured amount placed into a container such as a bag for individual potting applications (e.g., 4 gallon). On the other hand, the premixed soilless cultivation medium can also be used as replacement to soil for small containerless gardening and agronomy applications, although small gardening or agronomy applications may be economically challenging.

Another aspect of the invention is directed to the method of making the engineered soilless cultivation medium. The method involves providing predetermined amounts of peat moss, vermiculite and sand, preferably sharp sand, for the soilless substrate mixture, and also providing predetermined amounts of nutrient additives so that the standard Mehlich III soil extract test on the soilless cultivation medium result in a balanced amount of the major nutrient cations of calcium, magnesium, potassium and sodium as described above. The method also desirably requires that saturated paste test on the soilless cultivation medium be satisfied with respect to the major nutrient cations, as also described above. In accordance with this preferred method, the peat moss is surfactant-treated prior to mixing with the other ingredients. Raw ingredients for the nutrient additives are combined with the vermiculite and the sand, and mixed separately prior to mixing with the surfactant-treated peat moss. Once the surfactant-treated peat moss is mixed with the vermiculite, sand and nutrient additives, then a measured amount is placed in a container such as a bag appropriately sized for potting applications (e.g. four gallons).

When selecting the raw ingredients, it is important that the ingredients come from known sources and have relatively consistent compositions. For example, peat moss is known to have levels of major nutrient cations (calcium, magnesium, potassium and sodium) and anions (phosphorus and sulfate), as well as minor nutrients and trace elements. In addition, vermiculite typically contains calcium and magnesium. It is therefore important to account for these nutrients when selecting the identity and amount of raw materials for the nutrient additives. An example list of raw ingredients for the nutrient additives in one embodiment of the invention includes gypsum, dolomite lime, calcium bentonite clay, sulfated trace minerals, impregnated trace minerals, composted chicken manure, fertilizers containing potassium, magnesium and sulfur or other nutrients, potassium sulfate, phosphate, rock phosphate, borax, Chilean nitrate, feather meal, bone meal, volcanic ash, paramagnetic rock dust, argon and nitrogen mixtures, etc. In accordance with this aspect of the invention, predetermined amounts of the raw ingredients are selected so, according to a standard Mehlich III soil extraction test, the resulting engineered soilless cultivation medium has a cation exchange capacity within a preselected range, preferably about 10-15 mEq/100 g and more preferably about 12 mEq/100 g, and also so that the major nutrient cations are balanced according to the base cation saturation ratio method as described above. As mentioned, it is also desired that the major nutrient cations be balanced according to saturation paste test as described above. Further, it is desired that the soilless cultivation medium contain balanced amounts of major nutrient anions and minor elements both in terms of Mehlich III soil test results and saturation paste test results. To effectively accomplish this aspect of the invention, measured amounts of the specific raw ingredients are adjusted until the soilless cultivation medium falls within ranges for both the standard Mehlich III test and the saturation paste test for each of the major nutrient cations, and also preferably for each of the major nutrient anions and minor nutrients. Once the amounts of the specific raw ingredients have been determined to satisfy the standard Mehlich III test and the saturation paste test, the amounts are set for production purposes. These predetermined amounts are then used to mix each production batch of soilless cultivation medium, and it is not necessary to test each batch of soilless cultivation medium as long as the source of the ingredients is relatively consistent.

Other aspects and features of the invention may be apparent to those skilled in the art upon reviewing the following drawings and description thereof.

DETAILED DESCRIPTION

Figure 1:
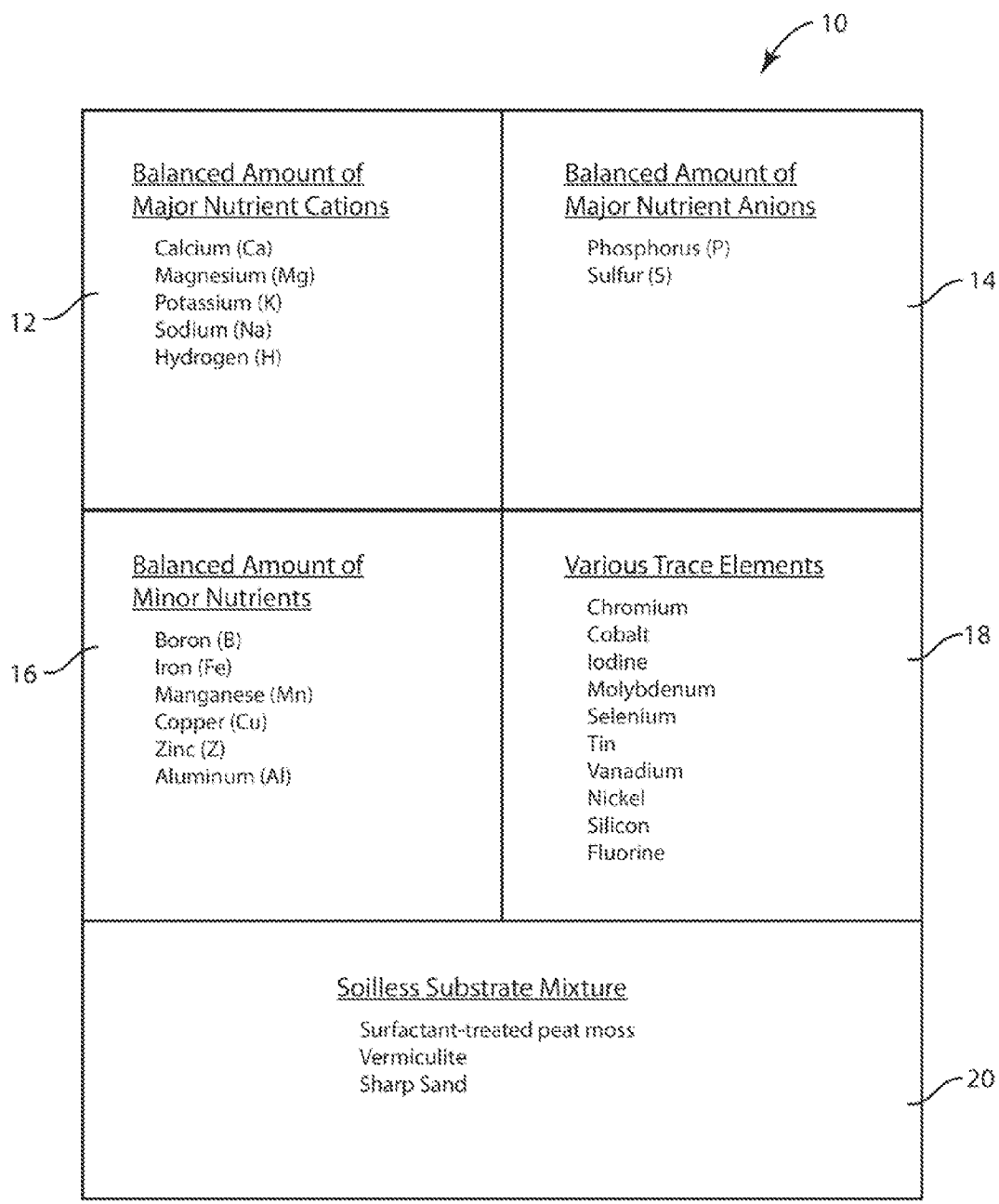
FIG. 1 is a schematic drawing illustrating constituents of a soilless plant cultivation medium manufactured in accordance with an exemplary embodiment of the invention.

Constituents of an engineered soilless cultivation medium 10 made in accordance with an exemplary embodiment of the invention are schematically illustrated in FIG. 1. The soilless cultivation medium 10 includes a soilless substrate mixture 20 comprising surfactant-treated peat moss, vermiculite and sharp sand. The soilless substrate mixture 20 is desirably about 70% by volume peat moss, about 20% by volume vermiculite and about 10% by volume sharp sand. The soilless substrate mixture 20 provides a soil like structure for cultivated plants, but is engineered to provide a more consistent composition than top soil. While the above ingredients are preferred for the soilless substrate mixture 20, aspects of the invention may be implemented using a different soilless substrate mixture 20. It is possible, however, to obtain the above ingredients from relatively consistent sources, and mixing of the above ingredients has proven to reliably provide a soilless substrate mixture 20 with consistent desirable properties.

Nutrient additives are combined with the soilless substrate mixture 20 so that the engineered soilless cultivation medium 10 includes balanced amounts of major nutrient cations 12, major nutrient anions 14 and minor nutrients 16. It is also desirable that the engineered soilless cultivation medium 10 include various trace elements 18. In accordance with the exemplary embodiment of the invention, it is desirable that the major nutrient cations as well as major nutrient anions and minor nutrients be balanced both according to Mehlich III soil analysis and saturation paste analysis. Table 1 below lists the preferred ranges in terms of Mehlich III soil analysis and saturation paste analysis for the engineered soilless cultivation medium 10. It also lists trace elements that are desirable to be present in the engineered soilless cultivation medium 10.

TABLE 1

|  | MEHLICH III SOIL ANALYSIS | SATURATION PASTE ANALYSIS |
|---|---|---|
| Total Cation Exchange Capacity (TEC) | 10 to 15 | |
| Organic Matter (humus) | >5% to <15% | |
| PH - Target is 6.4 | range 6.1 to 6.8 | range 6.1 to 6.8 |
| MAJOR NUTRIENT CATIONS: | | |
| Calcium (Ca) - target is 65% | range - 60% to 70% | 30-45 ppm |
| Magnesium (Mg) target is 15% | range - 10% to 20% | 7-8 ppm |
| Ca/Mg combined never to exceed 80% | | |
| Potassium (K) | 1% to 8% | 15-20 ppm |
| Sodium | <3% | <3 ppm |
| Exchangeable Hydrogen | 10% to 15% | |
| OTHER NUTRIENT ANIONS: | | |
| Phosphorus (P) | ppm 150 to 300 | ppm 1.5 to 2.5 |
| Sulfur (S) | ppm 30 to 60 | ppm 40 to 50 |
| MINOR NUTRIENTS: | | |
| Boron (B) | ppm .8 to 1.5 | 08. to .15 ppm |
| Iron (Fe) | ppm 100 to 300 | 80-120 ppm |
| Manganese (Mn) | ppm 30 to 60 | .07 to 1.5 ppm |
| Copper (Cu) | ppm 5 to 10 | .05 to 1.2 ppm |
| Zinc (Z) | ppm 3% of P | 3% of P |
| Aluminum (Al) | ppm <500 | ppm <2 |
| TRACE ELEMENTS: | | |
| Chromium | | |
| Cobalt | | |
| Iodine | | |
| Molybdenum | | |
| Selenium | | |
| Tin | | |
| Vanadium | | |
| Nickel | | |
| Silicon | | |
| Fluorine | | |

Referring to Table 1, it is desired that the total cation exchange capacity (CEC) of the soilless substrate mixture 20 be within the range of 10-15 mEq/100 g, and as mentioned the CEC of the engineered soilless cultivation medium 10 is most preferably 12 mEq/100 g. It is also desirable that the soilless substrate mixture 20 contain between 5 and 15% organic matter in the form of humus. The organic matter is provided in part by peat moss, but will also typically be provided in part through one or more of the nutrient additives. The pH of the engineered cultivation medium 10 is within the range of about 6.1-6.8 and is preferably about 6.4. The desired levels of the nutrients according to the Mehlich III soil analysis and saturation paste analysis illustrated in Table 1 are listed primarily in parts per million (ppm), with the important exception being the standard Mehlich III soil analysis for the major nutrient cations. In accordance with the BCSR method, the balanced amount of the major mineral cations Ca, Mg, K, Na are defined in terms of the percentage of the cation exchange capacity (CEC) of the soilless cultivation medium 10. In addition, it is desirable that the soilless substrate mixture 20 include exchangeable hydrogen comprising 10-15% CEC. Appropriate soil tests, both standard Mehlich III test and saturated paste test can be obtained from typical soil testing laboratories such as Logan Labs, LLC located in Lakeview, Ohio.

Figure 2:
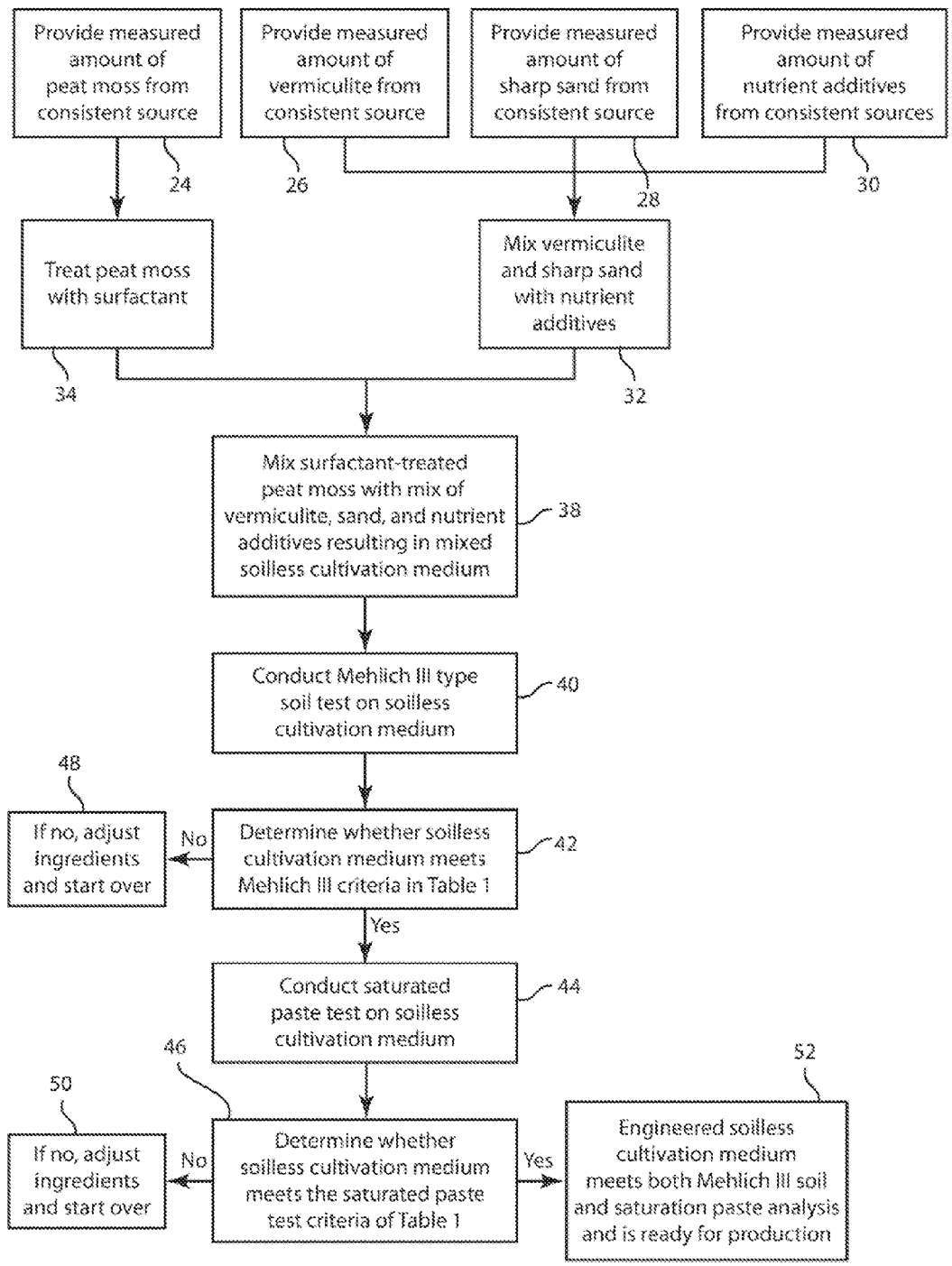
FIG. 2 is a flow chart illustrating steps taken in order to determine specific amounts of raw ingredients for obtaining the soilless cultivation medium described in FIG. 1.

The raw ingredients of the soilless cultivation medium 10 can attained from a variety of sources. Nevertheless, it is desirable that the ingredients come from consistent sources so that repeated Mehlich III and saturation paste analyses on batches of the engineered soilless cultivation medium 10 blended according to the same recipe provide the same results. Referring to FIG. 2, a precise recipe for a soilless cultivation medium 10 can be engineered by following the method depicted in FIG. 2. The method 22 in FIG. 2 begins by providing a measured amount of peat moss from a consistent source, see block 24. The preferred peat moss is sphagnum peat moss, and more particularly sphagnum peat moss sold under the trade name BP-Pro® from Berger, Saint-Modeste, QC. This peat moss is ground relatively fine and when mixed together with the other ingredients namely vermiculite and sharp sand provides an appropriate air pore space and water porous space (e.g. between 15% to 30%, preferably about 25%, air pore space and between 15% to 30%, preferably about 25%, water pore space). Still referring to FIG. 2, block 26 indicates that a measured amount of vermiculite is provided. While the composition of and minerals in vermiculite are relatively consistent from source to source, it is nonetheless desirable to obtain vermiculite from a consistent source to avoid, primarily, differences in the amount of calcium present in the vermiculite. Block 28 shows that a measured amount of sharp sand from a consistent source is then provided. The sharp sand is primarily inert silica. Sharp sand versus round sand is desirable in order to increase the amount of surface area of the sand and provide an appropriate amount of drainage, as well as air pore space and water pore space.

Block 30 in FIG. 2 indicates that measured amounts of nutrient additives are provided. As with peat moss, vermiculite and sharp sand, the raw ingredients for the nutrient additives should be provided from sources that are able to provide relatively consistent chemistry. An exemplary list of raw ingredients for nutrient additives includes: gypsum, dolomite lime, calcium bentonite clay, sulfated trace minerals, impregnated trace minerals, composted chicken manure, fertilizers containing potassium, magnesium and sulfur or other nutrients, potassium sulfate, phosphate, rock phosphate, borax, Chilean nitrate, feather meal, bone meal, volcanic ash, paramagnetic rock dust, and argon and nitrogen mixtures such as mixtures sold under the brand name Aragonite®.

Nitrogen of course is an important nutrient for plants; however, plants typically thrive over wide ranges of nitrogen concentrations. Several of the above listed ingredients are sources nitrogen, as is the organic matter present in the peat moss.

Block 32 in FIG. 2 illustrates that the vermiculite, sharp sand and the nutrient additives are mixed separately from the peat moss. Block 34 illustrates that the peat moss must be treated with surfactant, such as yucca root extract, as is known in the art enable the peat to absorb and hold water in the physical structure. The yucca root extract should be mixed, e.g., 1 liter per 1 cubic yard of peat for five (5) minutes. Block 38 indicates that the surfactant-treated peat mass is then mixed with the mixture of vermiculite, sand and nutrient additives which results in a mixed soilless cultivation medium. This mixed soilless cultivation medium contains known, measured amounts of peat moss, vermiculite, sharp sand and raw ingredients for the nutrient additives. As illustrated in Blocks 40 and 44 soil tests are conducted on the mixed soilless cultivation medium. Block 40 indicates that a standard Mehlich III type soil test is conducted on the soilless cultivation medium. Next, as illustrated in Block 42, it is determined whether the soilless cultivation medium meets the Mehlich III criteria in Table 1. If all of the Mehlich III criteria are not met, adjustments are made to the ingredients and the process is started over, see Block 48. On the other hand, if the soilless cultivation medium meets the Mehlich III criteria in Table 1, then a saturated paste test is conducted on the soilless cultivation medium, see Block 44. As illustrated in Block 46, it is determined whether soilless cultivation medium meets the saturated paste test criteria of Table 1. If all of the saturation paste test criteria are not met, Block 50, the ingredients are adjusted and the method is started over. If the answer is yes, see Block 52, the engineered soilless cultivation medium meets both the criteria for the Mehlich III soil analysis and the saturation paste analysis in Table 1 and is ready for production. Note that the steps in method 22 are exemplary and do not necessarily need to occur in the order the steps are listed. For example, it is not necessary that the Mehlich III test be conducted prior to conducting the saturated paste test. It is more likely in practice that the two tests will be conducted contemporaneously. Further, as should be apparent to those skilled in the art, it is highly desirable that the amount of the various ingredients be adjusted until the constituents in Table 1 are well within the desired ranges. In this manner, the resulting soilless cultivation medium is most likely to fall within the desired ranges even if there are relatively small inconsistencies in the compositions of the raw ingredients.

Figure 3:
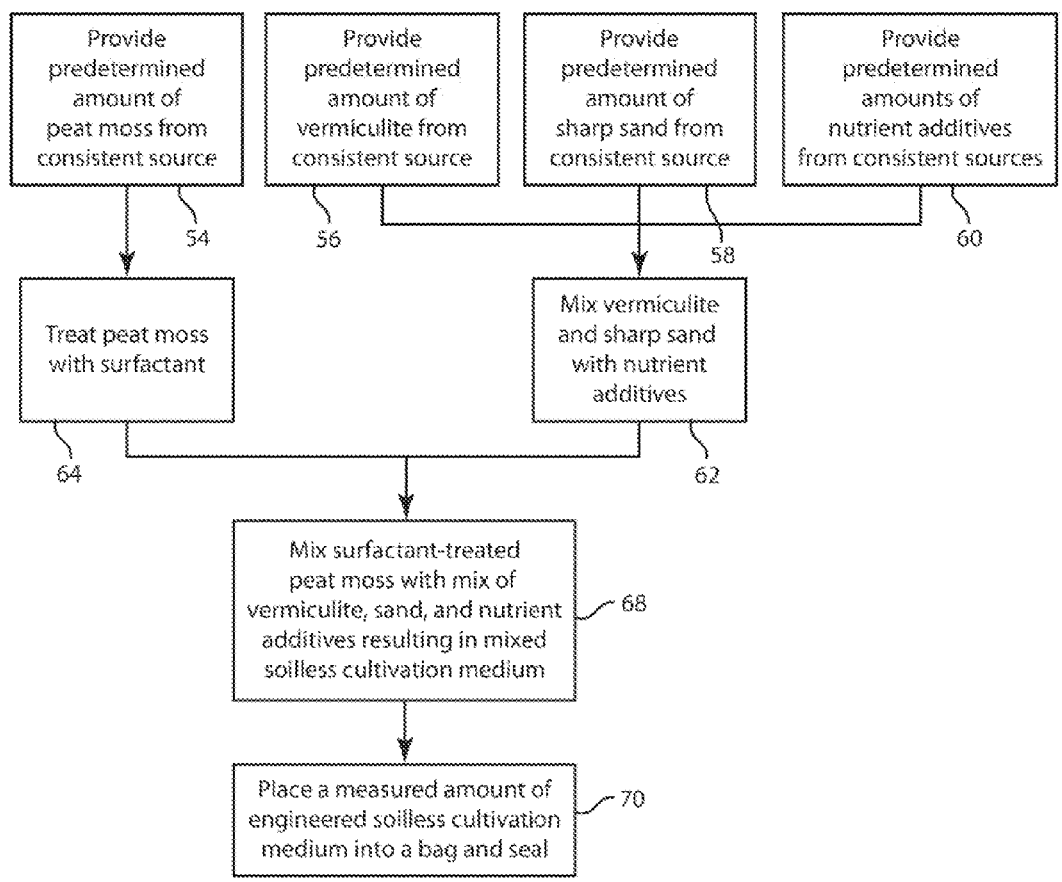
FIG. 3 is a flow chart illustrating a method of mixing and packaging a soilless cultivation medium made in accordance with the exemplary embodiment of the invention.

FIG. 3 illustrates a method of mixing and packaging the soilless cultivation medium made in accordance with the invention. Blocks 54, 56, 58 and 60 in FIG. 3 indicates that predetermined amounts of peat moss, vermiculite, sharp sand and nutrient additives are provided. These predetermined amounts in FIG. 3 are the measured amounts that are finally set, e.g., via the method depicted in FIG. 2. Block 62 in FIG. 3 indicates the vermiculite, sharp sand and nutrient additives are mixed together separate from the peat moss, and Block 64 indicates that the peat moss is treated with a surfactant. Block 68 in FIG. 3 indicates that the surfactant-treated peat moss is blended with the mix of vermiculite, sand and nutrient additives resulting in the engineered soilless cultivation medium 10. Next, as shown in Block 70 a measured amount of the engineered soilless cultivation medium 10 is placed into a bag (e.g. four gallons), and the bag is sealed for storage, shipment, distribution and use. In use, the engineered soilless cultivation medium 10 is removed from the bag, and is placed into a pot or growing container in place of soil or other potting mix.

In most applications, it is not necessary to add additional nutrients during the growing cycle. The availability of sufficient and balanced amounts of nutrients should result in shorter growing cycles, higher yields, and possibly when applicable more nutrient dense yields.

While it is preferred that all of the criteria in Table 1 be met, those skilled in the art will appreciate that many of the advantages of the invention can be attained even if only the major nutrient cations are essentially balanced according to the criteria in Table 1. Further, even if complete balance of the major nutrient cations according to the criteria in Table 1 is not completely achieved, the soilless cultivation medium should perform relatively better compared to a soil or potting mix that is comparably more out of balance. As mentioned above, the benefits of the invention can be realized to a lesser degree even if Mehlich III and saturated soil results on the soilless cultivation medium fall somewhat outside of the above listed ranges. In this regard, the term "about" means no more than a 10% numerical variation from an identified numerical value or from each numerical value listed for an identified range.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A pre-mixed, engineered cultivation medium having specific balanced amounts of the major nutrient cations calcium, magnesium, potassium, and sodium, the medium comprising:

a soilless substrate mixture; and nutrient additives comprising: 1) major nutrient cations including calcium, magnesium, potassium, and sodium 2) major nutrient anions including phosphorous and sulfur; 3) minor nutrient elements including boron, iron, manganese, copper, zinc and aluminum;

wherein according to Mehlich III soil extractions tests said engineered cultivation medium has a cation exchange capacity in the range of 10-15 mEq/100 g, and a base saturation percentage of the calcium is within the range of about 60% to 70% of the cation exchange capacity, a base saturation percentage of the magnesium is within the range of about 10% to 20% of the cation exchange capacity, a base saturation percentage of the potassium is within the range of about 3% to 8% of the cation exchange capacity, the base saturation percentage of the sodium less than about 3% of the cation exchange capacity and the base saturation percentage of exchangeable hydrogen is within the range of about 7% to 15% of the cation exchange capacity, the combination of the calcium and magnesium base saturation percentages does not exceed 80% of the cation exchange capacity and further wherein saturated paste tests on the engineered cultivation medium result in: calcium in the range of about 30-45 ppm, magnesium in the range of about 7-8 ppm, potassium in the range of about 15-20 ppm, and sodium less than about 3 ppm.

2. The pre-mixed, engineered cultivation medium as recited in claim 1 within wherein the cation exchange capacity of the soilless substrate mixture is within the range of about 11.5 mEq/100 g and 12.5 mEq/100 g.

3. The pre-mixed engineering cultivation medium as recited in claim 1 wherein the soilless substrate mixture comprises at least surfactant treated peat moss, vermiculite and sharp sand.

4. The pre-mixed, engineering cultivation medium as recited in claim 1 wherein the pH of the engineered cultivation medium is within a range of about 6.1 to 6.8.

5. The pre-mixed, engineering cultivation medium as recited in claim 1 wherein the soilless substrate includes at least 5% by volume organic material in the form of humus.

6. The pre-mixed, engineered cultivation medium as recited in claim 1A wherein the soilless substrate mixture and the mineral additives are pre-mixed and is placed into a growing container.

7. The pre-mixed, engineered cultivation medium as recited in claim 1 wherein the soilless substrate mixture and the mineral additives are pre-mixed and the medium is bagged for individual potting applications.

8. The pre-mixed, engineered cultivation medium as recited in claim 1 wherein the volume of the cultivation medium contains 15% to 30% water pore space.

9. The pre-mixed, engineered cultivation medium as recited in claim 1 wherein:
  phosphorus in the engineered cultivation medium is in the range of about 150-300 ppm, and saturated paste test of phosphorus is in the range of about 1.5 to 2.5 ppm;
  sulfur in the engineered cultivation medium is in the range of about 30-60 ppm, and saturated paste test of sulfur is in the range of about 30 to 50 ppm.

10. The pre-mixed, engineered cultivation medium as recited in claim 1 wherein:
  boron is present in the range of about 0.8-1.5 ppm, and a saturated paste test of boron is in the range of about 0.8-1.5 ppm;
  iron is present in the range of about 100-300 ppm, and a saturated paste test of iron is in the range of about 80-120 ppm;
  manganese is present in the range of about 30-60 ppm, and a saturated paste test of manganese is in the range of about 0.07-1.5 ppm;
  copper is present in the range of about 5-10 ppm, and a saturated paste test of copper is in the range of about 0.05-1.2 ppm;
  zinc is present in the range of about 3% ppm of phosphorus, and a saturated paste test of zinc is in the range of about 3% ppm of phosphorus; and
  aluminum is less than about 500 ppm, and a saturated paste test of aluminum is less than about 2.0 ppm.

11. The pre-mixed, engineered cultivation medium as recited in claim 1 further comprising the following trace elements: chromium, cobalt, iodine, molybdenum, selenium, tin, vanadium, nickel, fluorine and silicon.

12. A method of making a pre-mixed, engineered cultivation medium comprising a soilless substrate and nutrient additives and having specific balanced amounts of the major nutrient cations calcium, magnesium, potassium, and sodium, the method comprising the following steps:
  determining relative amounts of constituents for the soilless substrate and the nutrient additives for the pre-mixed, engineered cultivation medium by adjusting the relative amounts of the constituents for the soilless substrate and the nutrient additives until the resulting mixture has the following characteristics: (i) a cation exchange capacity (CEC) measured according to Mehlich III analysis; and (ii) the presence of major nutrient anions including phosphorus and sulfur and (iii) the presences of the major nutrient cations of calcium, magnesium, potassium, sodium and hydrogen, in the following amounts according to Mehlich III tests; the base saturation percentage of calcium is within the range of about 60-70% of the measured cation exchange capacity of the resulting mixture, the base saturation percentage of magnesium is within the range of about 10-20% of the measured cation exchange capacity of the resulting mixture, the base saturation percentage of the potassium is within the range of about 3-8% of the measured cation exchange capacity of the resulting mixture, and the base saturation of percentage of sodium is less than about 3% of the measured cation exchange capacity of the resulting mixture and the base saturation percent of exchangeable hydrogen is within the rage of about 7%-15% of the measured cation exchange capacity of the resulting mixture; the combination of the base saturation percentages for calcium and magnesium does not exceed 80% of the total cation exchange capacity of the resulting mixture;
  combining the determined relative amounts of the constituents of the soilless substrate and the nutrient additives and mixing to make the pre-mixed, engineered cultivation medium for end use, wherein the pre-mixed, engineered cultivation medium includes the major nutrient cations calcium, magnesium, potassium, and sodium in the following amounts measured by saturated paste tests: calcium in the range of about 30-45 ppm, magnesium in the range of about 7-8 ppm, potassium in the range of about 15-20 ppm, and sodium less than about 3 ppm.

13. A method as recited in claim 12 wherein the measured cation exchange capacity of the resulting mixture is in the range including and between about 10 mEq/100 g and about 15 mEq/100 g.

14. The method as recited in claim 12 wherein said major nutrient anions are present in the following amounts:
  Mehlich III test of the engineered cultivation medium results in phosphorus in the range of about 150-300 ppm, and saturated paste test of phosphorus is in the range of about 1.5 to 2.5 ppm;
  Mehlich III test of the engineered cultivation medium results in sulfur in the range of about 30-60 ppm, and saturated paste test of sulfur is in the range of about 30 to 50 ppm.

15. The method as recited in claim 12 wherein the determined relative amounts of constituents of the soilless substrate and the nutrient additives further result in the presence of minor nutrient elements including boron, iron, manganese, copper, zinc and aluminum in the pre-mixed, engineered cultivation medium.

16. The method as recited in claim 15 wherein said minor nutrient elements are present in the pre-mixed, engineered cultivation medium in the following amounts:
  boron according to Mehlich III tests is present in the range of about 0.8-1.5 ppm, and according to saturated paste tests is in the range of about 0.8-1.5 ppm;
  iron according to Mehlich III tests is present in the range of about 100-300 ppm, and according to saturated paste tests is in the range of about 80-120 ppm;
  manganese according to Mehlich III tests is present in the range of about 30-60 ppm, and a saturated paste tests of manganese is in the range of about 0.07-1.5 ppm;

copper according to Mehlich III tests is present in the range of about 5-10 ppm, and according to saturated paste tests is in the range of about 0.05-1.2 ppm;

zinc according to Mehlich III tests is present in the range of about 3% ppm of phosphorus, and according to saturated paste tests is in the range of about 3% ppm of phosphorus; and aluminum according to Mehlich III tests is less than about 500 ppm, and according to saturated paste tests is less than about 2.0 ppm.

17. The method as recited in claim 12 further comprising the step of bagging measured amounts of the pre-mixed, engineered cultivation medium.

18. The method as recited in claim 12 wherein the pH of the engineered cultivation medium is within the range of about 6.1-6.8.

* * * * *